Aug. 13, 1929.   M. J. DURNING ET AL   1,724,568
BRAKE
Filed Jan. 23, 1928
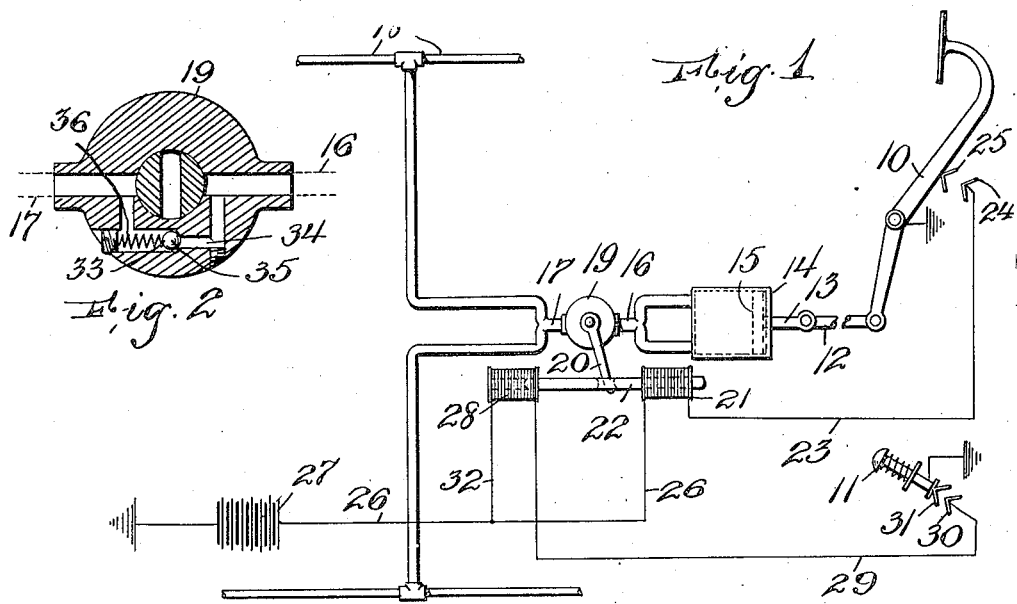
Fig. 1
Fig. 2
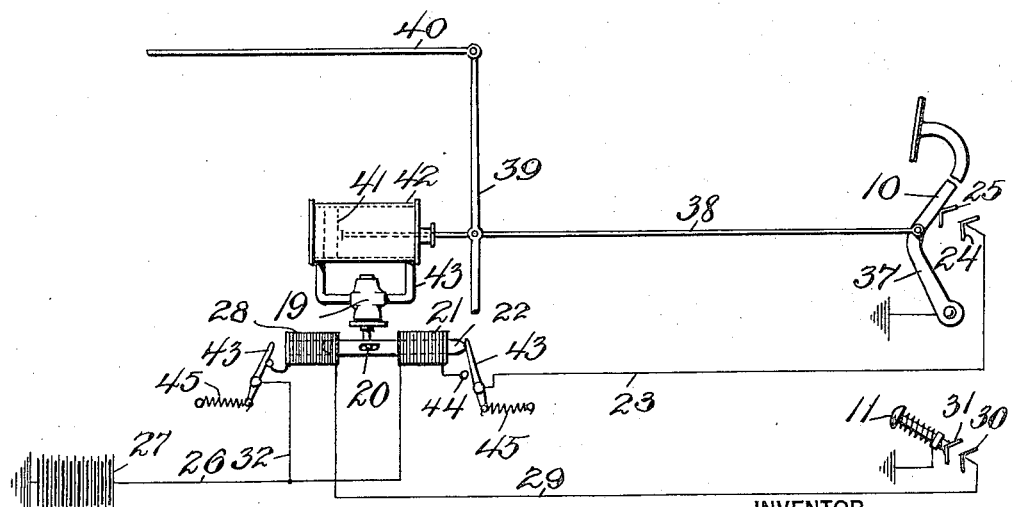
Fig. 3
INVENTOR
Martin J. Durning and
BY Joseph M. McGowan,
Wm H Caulfield
ATTORNEY Patented Aug. 13, 1929.

1,724,568

UNITED STATES PATENT OFFICE.

MARTIN J. DURNING AND JOSEPH M. McGOWAN, OF NEWARK, NEW JERSEY.

BRAKE.

Application filed January 23, 1928. Serial No. 248,618.

This invention relates to an improved brake mechanism for automobiles and can be incorporated as a new brake but also lends itself to attachment to an old brake on a car.

The invention is a brake which is provided with a check that locks the brake in position and the car does not move even when on a hill. In starting the car up hill from a stop the time that elapses between releasing the brake pedal and pressing on the accelerator is sufficient to cause the car to retreat, sometimes to a considerable extent, strains the engine when starting from this backward movement and makes it uncomfortable for the riders. The improvement therefore holds the car until the check and consequently the brake is released from the accelerator. This contributes to a deliberate and easy starting of the car and eliminates undue haste in finding the accelerator with the foot.

The invention is illustrated in the accompanying drawings in which the parts are shown diagramatically and only enough of the brake system is shown to make the cooperation of the parts clear.

Figure 1 shows a form of hydraulic four-wheel brake equipped with the improved check and Figure 2 is a horizontal cross-section of the valve which forms the check. Figure 3 is a view showing the invention applied to an ordinary mechanical brake.

In the drawing the brake pedal is shown at 10 and the accelerator is shown at 11. The brake pedal is connected to the piston rod 13 of the piston 14 in the cylinder 15. As the piston is pushed it forces fluid which is incompressible to pass through pipes 16 and 17 to the pipes 18 which distribute it to the four wheel mechanism which apply the pressure to stop the car. These are not shown as they are well-known articles of commerce.

The check in the form shown comprises a valve 19 which is provided with means such as the arm 20 by which it is opened and closed. The device shown employs a solenoid 21 for pulling the bar 22 which has a slot which receives the end of the arm 20. This closes the valve. The solenoid 21 is connected by a wire 23 with the contact 24 opposite the contact 25 on the brake pedal. The wire 26 connects the solenoid with the battery 27. The solenoid 28 pulls on the bar 22 to open the valve 19 and is connected by a wire 29 to the contact 30, opposite contact 31 on the accelerator 11. The wire 32 connects the solenoid 28 and the battery 27.

The operation of the brake is normal under slight pressure of the brake pedal as in slowing down as the contacts 24 and 25 are disposed so that the brake pedal has to be pushed down to stop the vehicle before the circuit in which the solenoid 21 is placed is closed. This contact closes the valve 19 as shown in Figure 2 and no fluid can return to release the brakes and this locking is of course still in operation even though the foot is removed from the pedal 10. The contact 24 is usually of the spring or yielding type in order to allow maximum movement of the brake pedal and in case of such excess pressure after the check or valve 19 is closed the power is still applied through a suitable check valve which is shown as within the casing of the valve 19 and consists of the ball 33 in the by-pass 34 and normally resting on the valve seat 35 in the by-pass under the influence of the spring 36. Any form of check by-pass can be used around the valve 19 and connecting pipes 16 and 17.

In the mechanical brake structure I show the brake pedal 37 with the brake rod 38 connected to the equalizing bar 39 of the brakes which are operated by the rods 40. The brake rod 38 has a piston 41 operating in the cylinder 42. The pipe 43 connects one end of the cylinder to the other end of the cylinder and the valve 19 is placed in this pipe. The same solenoid and its connections are used in this case to actuate the valve.

When the brake pedal is pressed down the piston 41 is pulled forward and it forces incompressible fluid from one side of the piston, through the by-pass 43 to the other side. The electrical connection at 24, and 25, causes the solenoid to close the valve 19 and the piston is held by the check 19 to brake the car.

When the brake pedal is released and the accelerator is pushed the connection 30, and 31 causes the solenoid 28 to open the valve and the brake is released.

Various modifications can be made in the mechanism without departing from the scope of the invention.

In order to economize on the battery it is advisable to insert make-and-break devices in the circuit actuating the solenoid so that as the check is operated the current is cut off from the solenoid last operated.

In the form shown we place the switches 43, one in the wire 32 and the other in the wire 23 and disposed so that the end of the armature 22, when it gets to the end of its travel, moves the switch just far enough to dis-connect it so that even although the contacts of the brake pedal and the accelerator might be pushed down and held down that particular circuit is broken as soon as the solenoid has operated. In the drawing the device is shown in Figure 3 and it illustrates the parts following the operation of the brake pedal in which the solenoid has moved switch 43 and the wire 23 to dis-connect it from the terminal or contact 44. Springs 45 or their equivalent can be used to insure the return of the switch to its closed position when the solenoid operates the other way.

We claim:—

1. The combination of an automobile with a braking system including a brake pedal and with an engine accelerating device, with a check for the braking system, a means operated from the brake pedal for making the check operative, and a means operated from the accelerator for releasing the check.

2. A check for a braking system of an automobile and adapted to be connected to the braking system to hold it in braking position, means for actuating the check from the brake pedal and means for releasing the check from the accelerator.

3. A check for the braking system of automobiles comprising a hydraulic check with an operating connection with the brake pedal and a releasing connection with the accelerator.

4. A brake having a cylinder with a piston therein and having a passage for incompressible fluid which fluid is forced by the piston in one direction when the brake is applied, means actuated by the brake mechanism for checking the return of said fluid, and means for releasing the checking means independently of the braking means.

5. A brake having a cylinder with a piston therein and having a passage for incompressible fluid which fluid is forced by the piston in one direction when the brake is applied, means actuated by the brake mechanism for checking the return of said fluid, and releasing means for said checking means, said releasing means being operable from the accelerator of an automobile.

6. An automobile brake comprising a holder of incompressible fluid, means operated from the brake to force said fluid in the holder when the brake is moved in the direction of application of the brake, means for preventing the return of the fluid, said prevention means being automatically actuated by the braking mechanism, and means operated from the accelerator of the automobile for releasing the prevention means.

7. An automobile brake comprising a holder of incompressible fluid, means operated from the brake pedal to force the fluid in one direction, a valve for preventing the return of the fluid, an electric circuit including the brake pedal and a solenoid for closing the valve, and a second circuit including the accelerator and a solenoid for opening the valve.

In testimony whereof we affix our signatures.

MARTIN J. DURNING.
JOSEPH M. McGOWAN.